(12) United States Patent
Knöll et al.

(10) Patent No.: US 8,021,009 B2
(45) Date of Patent: Sep. 20, 2011

(54) DOMESTIC APPLIANCE WITH AN INTERIOR WHICH CAN BE ILLUMINATED FROM THE DIRECTION OF A GLASS DOOR

(75) Inventors: Sebastian Knöll, München (DE); Gerhard Nüssler, München (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 529 days.

(21) Appl. No.: 12/085,074

(22) PCT Filed: Oct. 19, 2006

(86) PCT No.: PCT/EP2006/067593
§ 371 (c)(1),
(2), (4) Date: May 15, 2008

(87) PCT Pub. No.: WO2007/062918
PCT Pub. Date: Jun. 7, 2007

(65) Prior Publication Data
US 2009/0272136 A1    Nov. 5, 2009

(30) Foreign Application Priority Data
Nov. 30, 2005  (DE) .......................... 10 2005 057 154

(51) Int. Cl.
*F21V 33/00* (2006.01)
*F21V 7/04* (2006.01)
(52) U.S. Cl. .............................. 362/92; 362/602; 62/251
(58) Field of Classification Search .................. 362/222, 362/223, 154, 92–94, 602–605; 62/251, 62/264, 441
See application file for complete search history.

(56) References Cited

U.S. PATENT DOCUMENTS

| | | | | |
|---|---|---|---|---|
| 5,421,170 A | * | 6/1995 | Sodervall | 62/249 |
| 5,699,676 A | * | 12/1997 | Trulaske, Sr. | 62/264 |
| 6,059,420 A | * | 5/2000 | Rogers | 362/92 |
| 6,275,339 B1 | | 8/2001 | Chazallet et al. | |
| 6,325,523 B1 | * | 12/2001 | Santosuosso et al. | 362/125 |
| 6,361,181 B1 | * | 3/2002 | Bales | 362/92 |
| 6,438,983 B1 | * | 8/2002 | Zellner et al. | 62/246 |

(Continued)

FOREIGN PATENT DOCUMENTS
DE    198 57 561    6/2000
(Continued)

OTHER PUBLICATIONS
International Search Report PCT/EP2006/067593.

*Primary Examiner* — Bao Q Truong
(74) *Attorney, Agent, or Firm* — James E. Howard; Andre Pallapies

(57) ABSTRACT

A domestic appliance includes an interior that can be illuminated by a light source and is surrounded by walls and a door, wherein the interior is illuminated by the light source from the direction of the door, in particular wherein the door has at least one glass area, light from the light source is coupled into the glass area from the direction of an edge, with the result that the light is at least partially guided in the glass area, and the glass area has elements through which some of the light which is guided in the glass area is conducted into the interior. This manner of illumination prevents articles in the interior from having a silhouetted appearance.

21 Claims, 2 Drawing Sheets

U.S. PATENT DOCUMENTS

| | | |
|---|---|---|
| 6,443,582 B1 | 9/2002 | Tarne et al. |
| 6,481,130 B1 | 11/2002 | Wu |
| 6,578,978 B1 * | 6/2003 | Upton et al. ............... 362/92 |
| 2004/0031234 A1 | 2/2004 | Emde |
| 2004/0264168 A1 | 12/2004 | Gotz et al. |
| 2005/0081547 A1 | 4/2005 | Avenwedde et al. |
| 2005/0105303 A1 | 5/2005 | Emde |
| 2005/0258281 A1 | 11/2005 | Schwegler et al. |
| 2006/0138916 A1 * | 6/2006 | Kordon ................ 312/223.5 |
| 2006/0201181 A1 | 9/2006 | Bauer et al. |

FOREIGN PATENT DOCUMENTS

| | | |
|---|---|---|
| EP | 0 362 864 | 11/1990 |
| EP | 1 183 964 | 3/2002 |
| FR | 2 745 067 | 8/1997 |
| GB | 2 416 202 | 1/2006 |
| JP | 4-60376 | 2/1992 |
| JP | 5-295962 | 11/1993 |
| JP | 2000-258051 | 9/2000 |
| WO | WO 2004/104476 | 12/2004 |

* cited by examiner

DOMESTIC APPLIANCE WITH AN INTERIOR WHICH CAN BE ILLUMINATED FROM THE DIRECTION OF A GLASS DOOR

BACKGROUND OF THE INVENTION

The present invention relates to a domestic appliance, comprising an interior which can be illuminated with a light source and is surrounded by walls and a door, with the door having at least one glass surface.

Conventional domestic refrigerators are generally illuminated inside by an incandescent bulb, which is located in a transparent or translucent bulb housing in the interior of the refrigerator. The light source is activated by a suitable electromechanical switching device on the door opening system of the refrigerator. Such light sources tend, depending on the quantity of chilled goods filling the refrigerator, only to provide poor or uneven illumination, due to their position within the refrigerator.

More even illumination can be achieved by using a number of light sources, which is however not always desirable against a background of energy-efficient refrigerators, since each additional incandescent bulb represents a further heat source. Using a number of incandescent bulbs leads to an increase in heat radiation and an unwanted temperature rise within the refrigerator, which has to be compensated for by an increased cooling effect.

It has proven that in unfavorable ambient light conditions, in particular with dark spatial or room illumination, even if the interior illumination of the domestic appliance is even, the objects and goods in the interior cannot always be clearly identified, as they appear silhouetted due to illumination from behind or from the side. Low-contrast labels on the goods cannot be easily identified in a refrigerator for example, so that the goods have to be picked up and taken out of the refrigerator in order to be able to read the labels in better light conditions.

BRIEF SUMMARY OF THE INVENTION

The object of the present invention is to provide a domestic appliance having an interior which can be illuminated, with which the goods in the interior can be identified particularly easily.

According to the invention this object is achieved by the domestic appliance as specified in the independent claim. Advantageous embodiments and developments, which can respectively be used individually or combined with each other as required in a suitable manner, are the subject matter of the dependent claims.

The inventive domestic appliance comprises an interior which can be illuminated with a light source and is surrounded by walls and a door, with the interior being illuminated by the light source from the door. Illumination from the door means that the interior is illuminated from the front, in other words essentially from the direction of the user, thereby avoiding a silhouetted perception of the goods in the interior of the domestic appliance. At least one light source, in particular an illuminating surface is provided for this purpose on the door. The light source is advantageously configured and/ or its light beam characteristics are in particular provided in such a manner that light is directed and concentrated toward the interior. The light source is in particular suitable for illuminating the interior adequately from the front.

Illumination is therefore not or not exclusively provided from the side or rear but at least partially from the front as well, in other words by a door surface, with the result that the goods and objects in the interior appear less as silhouettes and can therefore be identified more easily.

It should be possible to identify the goods easily even when the door is closed. In particular with extremely full interiors, illumination from the front means that there is no shadow formation from the point of view of the user of the domestic appliance, which generally means that, in order to examine goods in the center of the interior more closely, the goods have to be taken out. Illumination from the front means that shadows are not cast on the goods by further goods in their proximity and the goods do not appear as dark silhouettes due to illumination from the rear. In particular the user is not dazzled by an excessively bright background when looking at the dark front faces of the goods. Illumination from the door therefore creates particularly effective illumination that is favorable for the user of the domestic appliance. This type of illumination is particularly advantageous when the user of the domestic appliance moves from a bright environment (e.g. from outside in bright sunlight) into a dark room, in which the domestic appliance is located. Illumination from the front ensures that goods in the interior can be easily identified even in unfavorable light conditions, when the user's eyes are still dazzled and have not yet become accustomed to a darker environment.

The door advantageously has at least one glass surface, with light from the light source being coupled into the glass surface from an edge, so that the light is guided at least partially in the glass surface and the glass surface has elements, through which some of the light guided in the glass surface is conducted into the interior or radiated to the interior.

The light is guided in the glass surface essentially by means of a fiber-optic effect. The light is guided in particular by total reflection of the light inside the glass surface. The glass surface ensures a view from outside into the interior of the domestic appliance. The elements are used to conduct or radiate the light guided inside the glass surface from the door into the interior, so that the goods in the interior are illuminated from the door. The elements can refract or reflect the light guided in the glass surface into or to the interior. The elements can also diffuse the light into the interior or refract it to the interior.

In certain circumstances it can also be advantageous if another part of the light guided in the glass surface is also guided outward. This is particularly advantageous when viewing the goods in the interior with the door closed is not a priority and the view into the interior with the door closed is to be at least partially interrupted. For example it is not always desirable to identify goods in the interior clearly and unambiguously and only a vague outline of the goods in the interior is required.

In particular more light is conducted inward than outward by the elements. In particular 10% to 30% of all the quantity of light guided in the glass surface is conducted outward. Coupling the light outward makes it difficult to see into the interior from outside when the door is closed. When the door is opened, the interior is illuminated from the door, in other words essentially from the front, and it is possible to identify the goods easily.

Light is advantageously conducted through the elements into or to the interior by diffusing, refracting and/or reflecting the light. The elements can be diffusing elements, which have a microscopic roughness or microscopic diffusion centers to randomize the direction of incident light, as happens for example with a matt disk. However the light can also be refracted into or to the interior by a lens or prism effect. The introduction of reflective surfaces, such as metal films or coatings, as insulation also allows light to be reflected. The light can also be conducted or radiated into the interior by total reflection by appropriate profiling of the elements.

In a further embodiment of the invention the elements have at least two optically active layers. For example an element has a diffusing surface toward the interior, which is coated in an opposing direction outward by a non-translucent material, so that light can be diffused into the interior but this same light cannot be diffused outward. Also a light-absorbent material can be used, which at least partially reduces the passage of light outward. An absorbent material can in particular color the light that passes outward.

It is advantageous if a considerable proportion of the light guided in the glass surface is conducted inward. The elements take up in particular between 30% and 80% of the total glass surface. The glass surface can form part of the door; preferably the glass surface represents essentially the whole door. In particular at least 70%, preferably at least 85%, of the surface of the door is provided in the form of a glass surface.

The glass surface has edge faces in particular and the light is coupled by way of the edge faces into the glass surface. The edge faces can in particular be curved, to avoid reflective losses at the edge faces, so that a particularly large quantity of light can be coupled into the glass surface.

The glass surface has a thickness in a range from 5 mm to 20 mm, preferably in a range from 6 mm to 9 mm. The glass surface can be made of inorganic glass or organic glass material, for example acrylic glass or plexiglass. The glass surface can be made of a plastic.

The elements are advantageously introduced onto or into the glass surface by etching, adhesion, sandblasting, grinding, laser machining, printing, fusing and/or hot molding.

A collimator is advantageously arranged between the light source and the glass surface. The collimator bundles the light from the light source onto the glass surface so that a particularly large quantity of light can be coupled into the glass surface. For example a cylindrical lens collimator is used, which couples the light from a rod-shaped light source or rod-shaped light source arrangement into the glass surface by way of an edge face or an edge of the glass surface. The collimator can also be provided in the form of a correspondingly curved cylindrical mirror. The edge face of the glass surface is advantageously non-reflecting.

In one particularly advantageous embodiment the domestic appliance is a refrigerator, an upright freezer or an upright fridge/freezer combination.

In this instance it is particularly advantageous if the glass surface is provided as at least double glazing. Double glazing or triple glazing allows the transfer of heat from outside into the interior to be reduced.

The walls of the domestic appliance are in particular configured as heat-insulating. The light source is advantageously arranged outside the refrigerated region, with light sources in particular being used, which have an emission spectrum whereby at least 20%, preferably at least 50%, in particular preferably at least 80% of the emitted radiant output is in the spectral range visible to the human eye.

In one modification the domestic appliance is a chimney or a cover element of an extractor hood, a cooker or an oven, a dishwasher or a washing machine. For these specific domestic appliances illumination of the interior from the door is also particularly advantageous, to achieve the optimal illumination for the user.

Glass shelf bases and/or transparent interior walls are advantageously provided in the interior, with the light source and glass shelf bases being arranged and/or the light source and transparent interior walls being provided in such a manner that light from the light source is coupled into the glass shelf bases and/or interior walls and is guided in the shelf bases or interior walls at least partially by total reflection.

A number of light sources can be provided for this purpose. The glass shelf bases and/or transparent interior walls are illuminated in particular from their edge. By guiding the light in the glass shelf bases and/or in the interior walls, it is possible to achieve even background and/or side illumination of the interior.

As described in relation to the door, elements can also conduct the light guided in the glass shelf bases and/or interior walls into the interior of the domestic appliance. The glass shelf bases advantageously have shelf base elements to diffuse and/or refract light.

In one specific embodiment the light source has a halogen spot or light-emitting diode and/or a number of halogen spots or a number of light-emitting diodes.

BRIEF DESCRIPTION OF THE DRAWINGS

Further advantageous details and specific embodiments, which can respectively be used individually or can be combined with each other as required in a suitable manner, are described in more detail with reference to the accompanying drawing, which is not intended to restrict the invention but simply to illustrate it by way of example.

DETAILED DESCRIPTION OF THE PRESENT INVENTION

Figure 1:
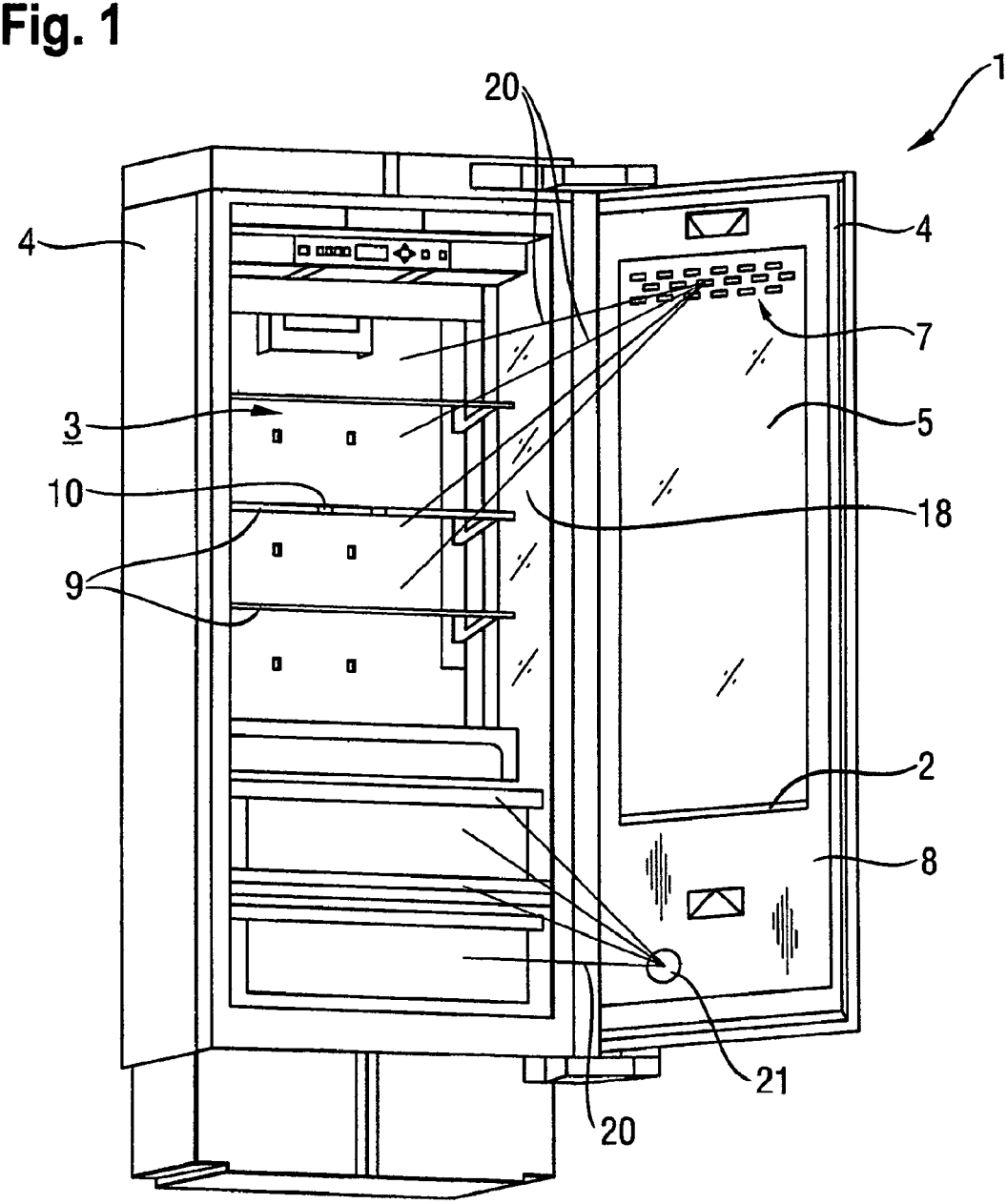
FIG. 1 shows a perspective view of an inventive domestic appliance with an open door and FIG. 2 shows a sectional view of part of the door of the inventive domestic appliance according to FIG. 1.

FIG. 1 shows a perspective view of an inventive domestic appliance 1 with an open door 8, which has a glass surface 5. The glass surface 5 takes up around 75% of the surface of the door 8. The domestic appliance 1 has an interior 3 enclosed by the walls 4 and door 8, in which glass shelf bases 9 and a transparent interior wall 18 are provided. The glass shelf bases 9 can have shelf base elements 10, which are used to conduct light coupled into the glass shelf bases 9 and guided therein into the interior 3. The glass surface 5 has elements 7, which conduct some of the light guided in the glass surface 5 into the interior 3. The light in the glass surface 5 of the door 8 is introduced by way of a rod-shaped light source 2. The interior 3 is illuminated by light beams 20 from the door 8, with the result that the goods in the interior 3 are illuminated from the front from the point of view of the user looking into the interior 3, so that easy identification of the goods is ensured. A further light source, for example an incandescent bulb, a halogen spot, a light-emitting diode array or a gas discharge lamp, is provided on the door as a supplement to this.

Figure 2:
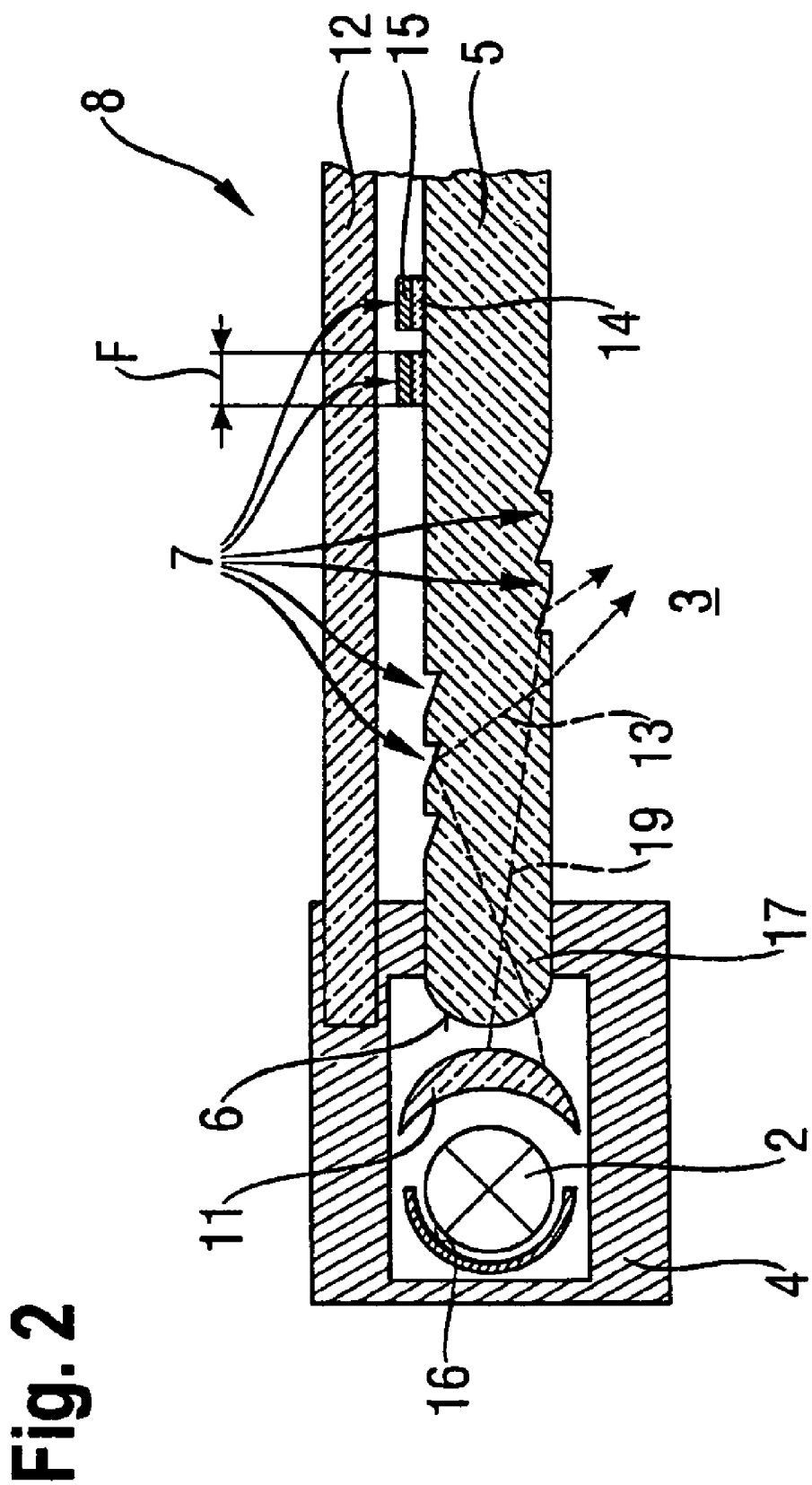

FIG. 2 shows a sectional view of the door 8 in FIG. 1 with the glass surface 5, which has the elements 7. Some of the elements 7 are provided as profiling of the surface of the glass surface 5, so that a light beam 3 from the light source 2 is diffused and/or reflected into the interior 3 by total reflection. Some of the elements 7 are provided as indentations in the glass surface 5, so that a second light beam 19 can exit from the glass surface 5. Some of the elements 7 have a diffusing part 14 and a covering part 15, with the result that light from the light source 2 is preferably directed into the interior 3. The total of all surfaces F of the elements 7 comprises around 50% of the total surface of the glass surface 5. A second glass surface 12 serves as double glazing, to improve the heat insulation of the door 8. Light from the light source 2 is coupled with the aid of a reflective surface 16 and a collimator 11 by way of an edge face 6 of the glass surface 5, so that the light is guided into the glass surface 5 by means of a waveguide effect. The light is thus coupled from an edge 17 of the glass surface 5. With the reflective surface 16 and the collimator 11 it is possible to couple a particularly high proportion of the light generated by the light source into the glass surface 5. The door 8 has a wall 4, which has a heat insulating material (not shown), bringing about heat insulation of the interior 3.

The invention relates to a domestic appliance 1, comprising an interior 3 which can be illuminated with a light source 2 and is surrounded by walls 4 and a door 8, with the interior 3 being illuminated by the light source 2 from the door 8, in particular with the door 8 having at least one glass surface 5, light from the light source 2 being coupled into the glass surface 5 from an edge 17, so that the light is guided at least partially into the glass surface 5 and the glass surface 5 having elements 7, through which some of the light guided in the glass surface 5 is conducted into the interior 3. The invention is characterized in that the illumination of the interior 3 from the door 8, in other words from the front, creates an illumination which is particularly favorable for the user of the domestic appliance 1, preventing goods in the interior 3 from appearing in silhouette.

LIST OF REFERENCE CHARACTERS

1 Domestic appliance
2 Light source
3 Interior
4 Wall
5 Glass surface
6 Edge face
7 Elements
8 Door
9 Glass shelf base
10 Shelf base elements
11 Collimator
12 Second glass surface
13 Light beam
14 Diffusing part
15 Covering part
16 Reflective part
17 Edge
18 Interior wall
19 Second light beam
20 Light beams
21 Further light source
F Surface of element 7

The invention claimed is:

1. A domestic appliance comprising: an interior; a light source; the interior being illuminated with the light source; the interior being surrounded by walls and a door; the light source associated with the door; the interior being illuminated by the light source from the door, wherein the door includes at least one glass surface; light from the light source being coupled on to the glass surface from an edge, whereby the light is guided at least partially on to the glass surface; the glass surface including elements having at least two optically active layers through which some of the light guided on to the glass surface is transmitted into the interior.

2. The domestic appliance as claimed in claim 1 wherein more light is conducted inward than outward by the elements.

3. The domestic appliance as claimed in claim 2 wherein 10% to 30% of the total quantity of light conducted onto the glass surface is conducted outward.

4. The domestic appliance as claimed in claim 1 wherein the light is conducted by the elements by diffusing the light.

5. The domestic appliance as claimed in claim 1 wherein the light is conducted by the elements by refracting the light.

6. The domestic appliance as claimed in claim 1 wherein the light is conducted by the elements by reflecting the light.

7. The domestic appliance as claimed in claim 1 wherein the glass surface has edge faces and the light is coupled onto the glass surface by way of the edge faces.

8. The domestic appliance as claimed in claim 1 wherein the elements are introduced with respect to the glass surface by a process taken from the group consisting essentially of etching, adhesion, sandblasting, grinding, laser machining, printing, fusing and hot molding.

9. The domestic appliance as claimed in claim 1 wherein the door includes at least a plastic surface.

10. The domestic appliance as claimed in claim 1 wherein the glass surface includes at least double glazing.

11. The domestic appliance as claimed in claim 1 wherein the domestic appliance is a refrigerator.

12. The domestic appliance as claimed in claim 1 wherein the domestic appliance is an upright freezer.

13. The domestic appliance as claimed in claim 1 wherein the domestic appliance is an upright fridge/freezer combination.

14. The domestic appliance as claimed in claim 1 wherein the domestic appliance is taken from the group consisting essentially of a chimney, a cover element of an extractor hood, a cooker, an oven, a dishwasher and a washing machine.

15. The domestic appliance as claimed in claim 1 further including glass shelf bases provided in the interior the light source and glass shelf bases being arranged in such a manner that light from the light source is coupled into the glass shelf bases and is guided in the shelf bases at least partially by total reflection.

16. The domestic appliance as claimed in claim 1 further including transparent interior walls provided in the interior; the light source and the transparent walls being provided in such a manner that light from the light source is coupled into the interior walls and is guided in the interior walls at least partially by total reflection.

17. The domestic appliance as claimed in claim 15 wherein the glass shelf bases have shelf base elements to diffuse light.

18. The domestic appliance as claimed in claim 15 wherein the glass shelf bases have shelf base element to refract light.

19. The domestic appliance as claimed in claim 1 wherein the light source includes a halogen spot.

20. The domestic appliance as claimed in claim 1 wherein the light source includes a light emitting diode.

21. A domestic appliance comprising: an interior having plurality of walls and a door, the door includes at least one glass surface; a light source, and a collimator arranged between the light source and the glass surface, wherein the light source is associated with the glass surface of the door, and wherein light from the light source is guided at least partially into the glass surface; and elements provided in the glass surface, wherein the interior is illuminated through at least a portion of the light conducted by the elements.

* * * * *